US009173516B1

(12) United States Patent
Messer

(10) Patent No.: US 9,173,516 B1
(45) Date of Patent: Nov. 3, 2015

(54) MICROWAVE OVEN MIXING DEVICE

(71) Applicant: Michael G Messer, Plano, TX (US)

(72) Inventor: Michael G Messer, Plano, TX (US)

( * ) Notice: Subject to any disclaimer, the term of this patent is extended or adjusted under 35 U.S.C. 154(b) by 341 days.

(21) Appl. No.: 13/784,794

(22) Filed: Mar. 4, 2013

Related U.S. Application Data

(60) Provisional application No. 61/646,251, filed on May 11, 2012.

(51) Int. Cl.

| | |
|---|---|
| ***H05B 6/78*** | (2006.01) |
| ***B01F 7/16*** | (2006.01) |
| ***A47J 27/56*** | (2006.01) |

(52) U.S. Cl.
CPC ....................................... *A47J 27/56* (2013.01)

(58) Field of Classification Search
CPC ....... H05B 6/6411; H05B 6/782; Y10S 99/14
USPC ......... 219/726, 685, 738, 756, 752, 753, 755, 219/762, 518; 99/438, 451, DIG. 14; 366/213, 231, 282, 325.92; 426/241, 426/243
See application file for complete search history.

(56) References Cited

U.S. PATENT DOCUMENTS

| | | | | |
|---|---|---|---|---|
| 1,762,094 | A | 6/1930 | Goetz | |
| 1,772,083 | A | 8/1930 | Hollenback | |
| 4,773,317 | A | 9/1988 | Wickboldt, Jr. | |
| 4,904,834 | A * | 2/1990 | Bowen | 219/726 |
| 5,271,673 | A | 12/1993 | Bohnet et al. | |
| 5,863,121 | A * | 1/1999 | Dunk | 366/285 |
| 6,933,484 | B2 | 8/2005 | Lindley et al. | |
| 7,022,956 | B2 | 4/2006 | Greenstreet | |
| 2003/0160048 | A1 | 8/2003 | Chen | |
| 2004/0251250 | A1 * | 12/2004 | Haedrich | 219/726 |
| 2009/0218337 | A1 | 9/2009 | Fang | |

FOREIGN PATENT DOCUMENTS

| | | | |
|---|---|---|---|
| GB | 2159027 | A | 11/1985 |
| GB | 2322271 | A | 8/1998 |
| GB | 2370240 | A | 6/2002 |
| WO | WO9310648 | A1 | 5/1993 |

* cited by examiner

*Primary Examiner* — Quang Van

(74) *Attorney, Agent, or Firm* — Handley Law Firm, PLLC; Mark W Handley

(57) ABSTRACT

A microwave oven mixing device (12) has an enclosure (14) which is free-standing and has an open bottom 26. A stirring paddle (16) is secured in a fixed position to the enclosure (14) and extends downward from a top (28) of the enclosure (14). The enclosure (14) is placed in a microwave oven (6) with the stirring paddle (16) extending into the contents of container (18) which is located atop a turntable (10). The enclosure (14) has two telescopically extendable halves (22, 24) which are configured in fixed relation to one another for engaging at least two walls of the microwave oven (6) to hold the stirring paddle (16) in fixed relation to the oven (8) as the contents of the container (18) are moved by the turntable (10) against the stirring paddle (16) to stir the contents.

20 Claims, 4 Drawing Sheets

MICROWAVE OVEN MIXING DEVICE

CROSS-REFERENCE TO RELATED APPLICATIONS

The present application claims priority as a continuation-in-part to U.S. Provisional Patent Application Ser. No. 61/646,251, filed May 11, 2012, invented by Michael G. Messer, and entitled "Microwave Oven Mixing Device."

TECHNICAL FIELD OF THE INVENTION

The present invention relates in general to cooking apparatus, and in particular to a stationary mixing device for use in microwave ovens.

BACKGROUND OF THE INVENTION

Microwave ovens have became staples of modern kitchens since the 1960's and are well known to provide rapid cooking of food items. A common problem with microwave ovens is that food items are not uniformly heated when disposed in stationary positions. To overcome this problem turntables are commonly provided in microwave ovens to rotate food items during cooking. However, for foods which can be stirred, even when turntables are used it is typically necessary to stir such food during microwave cooking to provide more uniform heating and a more homogenous temperatures for the food. Typically, the oven is stopped at least once during the cooking cycle, the food is stirred, and then cooking is resumed. It is desirable to automatically stir food while it is being cooked in microwave ovens and thus provide more uniform cooking temperatures, without having to interrupt cooking for manual stirring procedures.

SUMMARY OF THE INVENTION

A microwave oven mixing device is disclosed having a free-standing enclosure and a stirring paddle. The enclosure has four sides which preferably include four enclosed sides, a top and an open bottom. The enclosure is sized for removably fitting within a cooking cavity of a microwave oven and over the top of a container holding contents of the container, such as food, for mixing. The enclosure has at least two opposing sides which engage opposing sidewalls of the cooking cavity of the microwave oven to prevent rotation of the enclosure within the main cooking cavity. The stirring paddle is non-rotatably mounted to and extends downward from a top of the enclosure into an interior of the enclosure. The mixing device is configured so that it will be placed over a container in a microwave oven and the stirring paddle will extend into the contents of the container. The container is disposed atop a turntable and is rotated as the mixing device remains stationary, with rotary movement of the container and the turntable moving the contents of the container around the stirring paddle to mix the contents. The mixing device is considered a passive mixer in that the mixing device and the stirring paddle remain stationary as the contents of a container are moved through the stirring paddle.

The enclosure of the mixing device is preferably formed of two halves which include a first enclosure half and a second enclosure half. The first and second enclosure halves each have a series of side ports extending through opposed sides, and each also have a pair of tabs extending from the opposed sides. The side ports and the tabs are configured for aligning the tabs with selective ones of the side ports for extending respective tabs there-through to secure the first half and the second half together in fixed relation. The overall length of the enclosure is selectively determined by which of the side ports the tabs extend through. Preferably, the tabs provided on the first enclosure extend outward from the opposed sidewalls thereof, the tabs provided on the second enclosure extend inward from the opposed sidewalls thereof, and the first enclosure half and the second enclosure half are sized for slidably extending the first enclosure within the second enclosure half.

A plurality of upper ports are provided through the top of the first enclosure half and the top of the second enclosure half. One of the upper ports in the first enclosure half is aligned in registration with another of the upper ports in the second enclosure half for selectively receiving the two connecting prongs of the stirring paddle. The two connecting prongs extend upward from an upper end of the stirring paddle and pass through the two upper ports to non-rotatably secure the stirring paddle in fixed relation to the enclosure, with the stirring paddle extending downward from the top of the enclosure into the interior of the enclosure. The stirring paddle has four stirring rods which extend downward from the upper end of the stirring paddle, and which have lower ends extending spaced apart and in parallel for sufficient length for engaging with contents of a container disposed within the enclosure.

Protrusions extend outwardly from the sides of the enclosure at a uniform height from the bottom of the enclosure for engaging lower edges of a second enclosure when stacked atop the enclosure for stowage with a plurality of the enclosures and stirring paddles.

DESCRIPTION OF THE DRAWINGS

For a more complete understanding of the present invention and the advantages thereof, reference is now made to the following description taken in conjunction with the accompanying Drawings in which

FIG. 1 is a perspective view a microwave oven with a microwave oven mixing device made according to the present invention, with the microwave oven shown in phantom;

FIG. 2 is an exploded view of the microwave mixing device;

FIG. 3 is a perspective view of a first part of an enclosure for the microwave mixing device;

FIG. 4 is a perspective view of a second part of the enclosure for the microwave mixing device;

FIG. 5 is a side elevation view of a stirring paddle for the microwave mixing device;

FIG. 6 is a perspective view of a several of the microwave mixing devices being stacked for stowage and shipping;

DETAILED DESCRIPTION OF THE INVENTION

Figure 1:
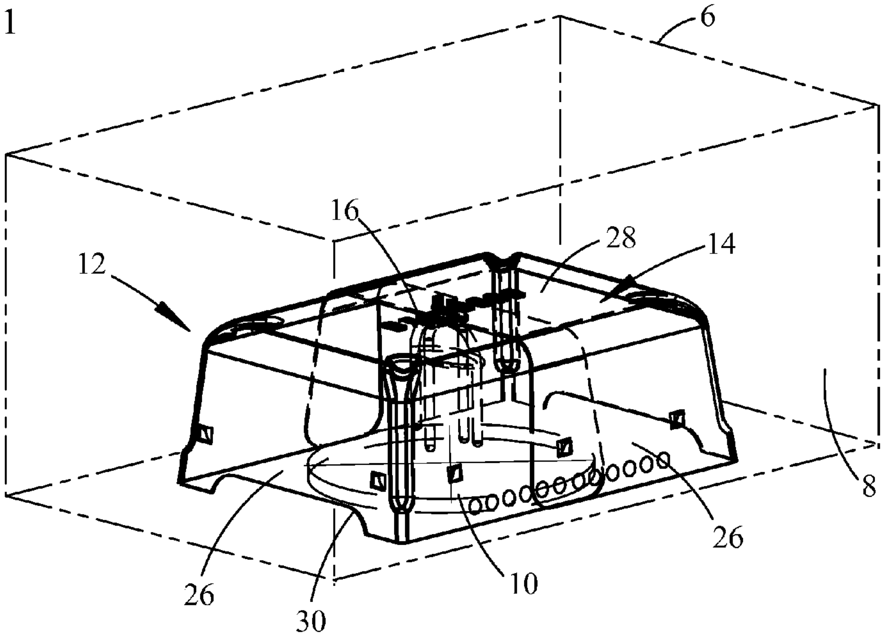
FIGS. 1 through 6 show various aspects for microwave oven mixing device devices made according to the present invention, as set forth below.

FIG. 1 is a perspective view of a microwave oven 6 and a microwave oven mixing device 12 made according to the present invention, with the microwave oven 6 shown in phantom. The microwave oven 6 has a main cooking cavity 8 and a turntable 10 located in the cooking cavity 8, as are well known in the art. The mixing device 12 has an enclosure 14 which is preferably free-standing and a stirring paddle 16.

The stirring paddle extends downward from the enclosure 14 into a central portion of the enclosure 14 and into the contents of a container 18 (shown in hidden lines), such as food within a mixing bowl. The mixing device 12 is preferably a stationary mixer in that it does not move relative to the oven 6 and the environment surrounding the oven 6. Instead, the container 18 and the contents of the container 18 are moved by the turntable 10 as the microwave mixer 12 remains stationary, causing the contents of the container and the container 18 to move around the stirring paddle 16. The enclosure also has an enclosed top 28, sidewalls 26, and an open bottom 30. The bottom 30 is preferably fully open for receiving the container 18 and its contents as the enclosure 14 is lowered atop the container 18 in the cavity 8 of the oven 6. The sidewalls 26 and the top 28 are preferably configured to enclose five sides of the enclosure 14.

Figure 2:
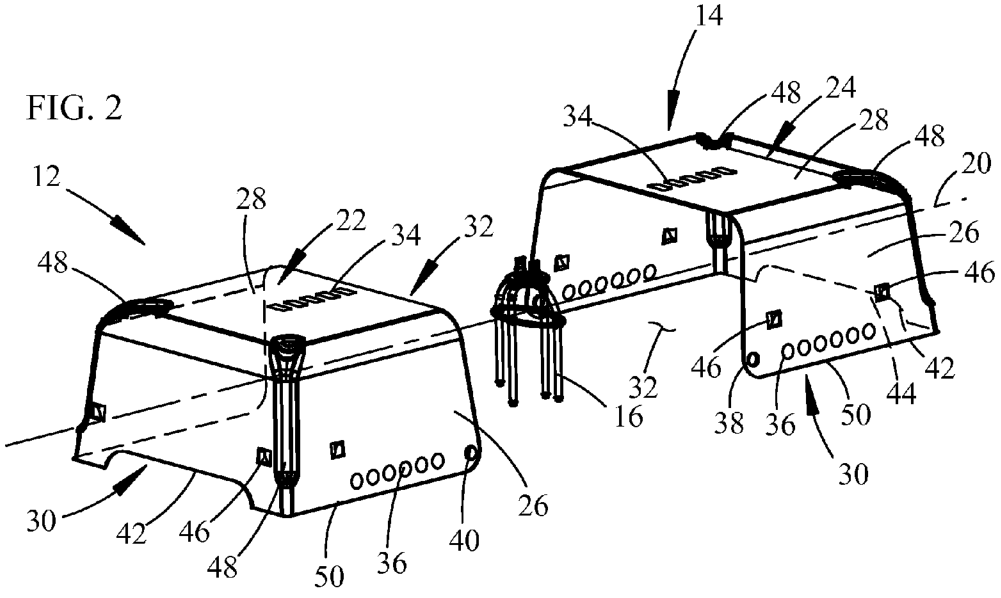

FIG. 2 is an perspective, exploded view of the microwave oven mixing device 12. The enclosure 14 has two parts: an inward enclosure half 22 which defines a first part and an outward enclosure half 24 which defines a second part. The enclosure halves 22 and 24 are shown separated with the stirring paddle located between the enclosure halves 22 and 24. The inward enclosure half 22 and the outward enclosure half 24 are configured to telescopically extend along a longitudinal axis 20 of the enclosure 14 for fitting within the cooking cavity 8 of the oven 6 and then securing together in fixed relation to one another. When configured together the enclosure halves 22 and 24 define the four sidewalls 26 which preferably are substantially orthogonally aligned to define a substantially rectangular cross-section. At least two of the sidewalls 22 define sides for the enclosure 14 which will fit against the walls of the main cooking cavity 8 of the microwave oven 6 to prevent rotation of the enclosure 14 during rotation of the turntable 10. The tops 28 of the two enclosure halves 22 and 24 preferably have a plurality of upper ports 34 aligned in a row extending parallel to the longitudinal axis 20 of the enclosure 14. The upper ports 34 are preferably rectangular in shape and serve to vent gasses during heating of the contents of the container 18 in the oven 6. One of the upper ports 34 of the inner enclosure half 22 and one of the upper ports 34 of the outer enclosure half 24 are aligned in registration for receiving upwardly extending protrusions defined by connecting prongs 60 of the stirring paddle 16, which secures the stirring paddle 16 in fixed position relative to the enclosure 14. Preferably, the stirring paddle 16 is centrally disposed within the enclosure 14, and extends vertically downward when the open bottom 30 of the enclosure is placed on a horizontal surface.

Figure 3:
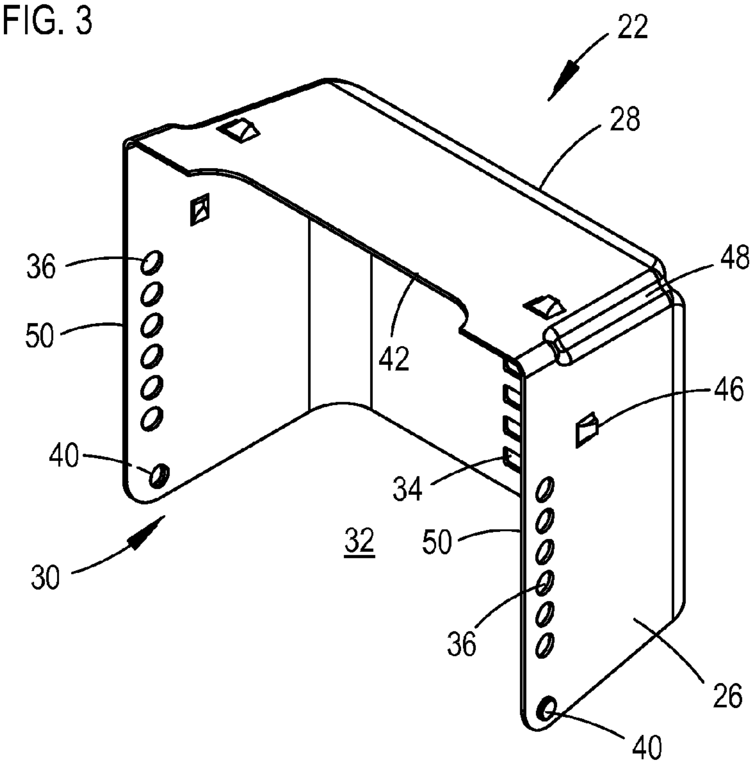
Figure 4:
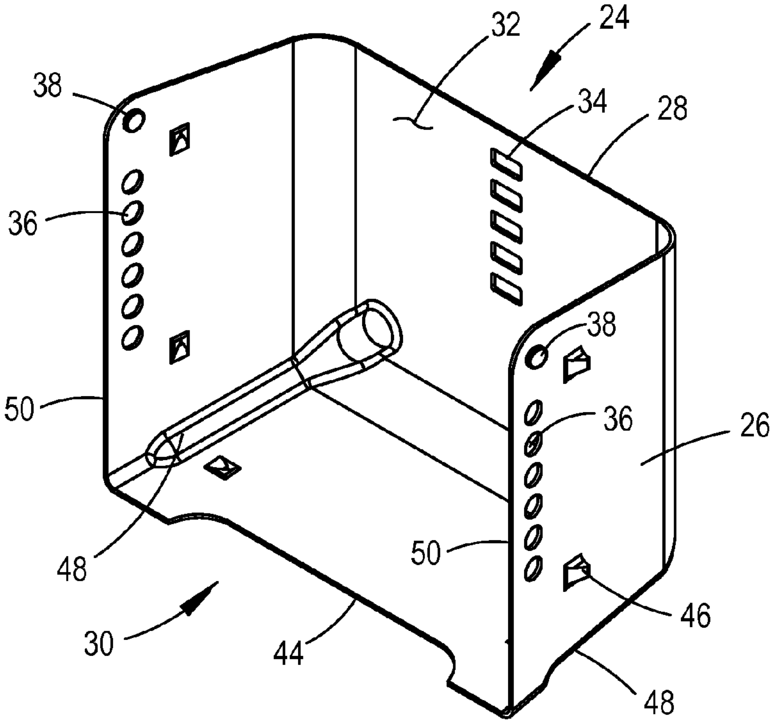

FIGS. 3 and 4 are perspective views of the inner enclosure half 22 and the outer enclosure half 24, respectively, looking upward and underneath the halves 22 and 24. A series of side ports 36 extending parallel to the longitudinal axis 20 of the enclosure 14 on opposite longitudinal sides of each of the two halves 22 and 24, preferably spaced apart uniform distances from lower edges of the enclosure 14. Each of the enclosure halves 22 and 24 have an open side 32 and three sides which are defined by and enclosed by respective ones of the sidewalls 26, with a central one of the sidewalls 26 defining an end of the enclosure and two of the sidewalls 26 defining opposed sides which are disposed on opposite sides of the sidewall 26 defining the enclosure end. The inward enclosure 22 has an outer periphery which is slightly smaller than an interior profile of the outward enclosure 24 such that the open end of the inward enclosure 22 will fit inside the interior profile of the outward enclosure 24, with the tops 28 and the opposed ones of the sidewalls 26 partially overlapping to enclose the interior of the enclosure 14, as shown in FIG. 1.

The open end of the inward enclosure 22 has two tabs 40 defining protuberances on opposite sides of the inward enclosure 22 which extend outward from the opposed ones of the sidewalls 26 and which located and are sized for fitting within selectable ones of the side ports 36 of the outward enclosure half 24, as shown in FIG. 1. Similarly, the open end of the outward enclosure 24 has two tabs 38 defining protrusions on opposite sides of the outward enclosure half 24 which extend inward from the opposed ones of the sidewalls 26 and which are located and sized for fitting within selectable ones of the side ports 36 of the inward enclosure half 22, as shown in FIG. 1. The tabs 38 and 30 fit within respective ones of the side ports 36 for securing the enclosure halves 22 and 24 together in a fixed longitudinal length, sized for fitting within and engaging the walls of the interior 8 of the oven 6. Respective portions of the tops 28 of each of the halves 22 and 24 will also be overlapped to combine with the tabs 28 and 40 for securing the enclosures halves together in fixed relation. The two connecting prongs 16 of the stirring paddle 16 fit within the selected two of the upper ports 34 which are aligned in registration to further secure the two enclosure halves 22 and 24 together during use.

The enclosure half 22 has a lower slot 42 on a lower edge 50 of the end sidewall 26 thereof, and the enclosure half 24 has an edge slot 44 on the lower edge 50 of the end sidewall 26 thereof. The lower slot 42 and the edge slot 44 are provided to allow the turntable 10 to pass through the sidewalls 26 for smaller microwave ovens 6 having smaller cavities 8 which require that the enclosure halves 22 and 24 be secured in closer fitting arrangement to fit with narrower spaces. The slots 42 and 44 also provide venting of the interior of the enclosure 14. Corners of the sidewalls 26 enclosure halves 22 and 24 are joined with flutes 48 to provide added structural strength for the enclosure 14. Stacking tabs 46 are provided to extend outward from each side of the sidewalls 26 of the enclosure halves 22 and 24, at a selected height disposed between the top 28 and the bottom 30. The stacking tabs 46 are engages by the lower edges 50 of respective ones of the sidewalls 26 when one microwave cooking device 12 is placed atop another microwave cooking device 12 for stowage in packaging and shipping.

Figure 5:
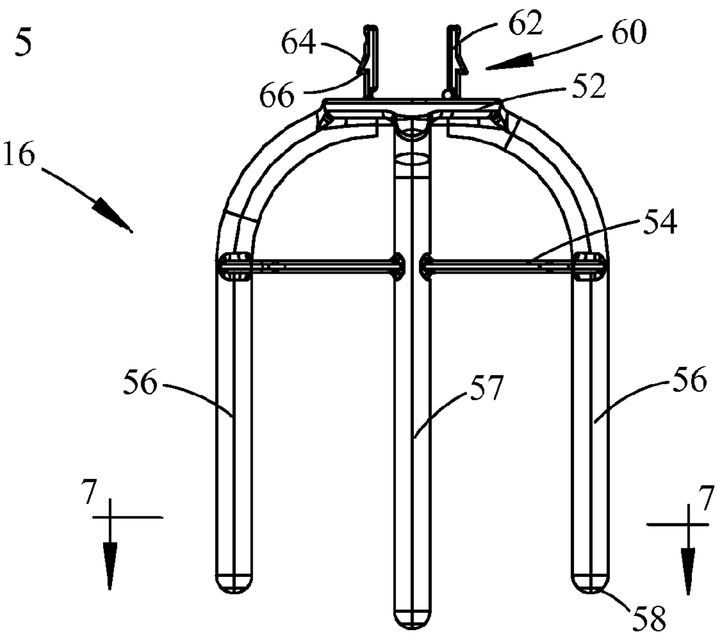

FIG. 5 is a side elevation view of the stirring paddle 16 for the microwave oven mixing device 12. The stirring paddle 16 preferably has an upper end 52 providing an interconnecting main body portion for the stirring paddle 16. Two stirring rods 56 are disposed in opposed relation and two stirring rods 57 are disposed in opposed relation, with the opposed stirring rods 56 and the opposed stirring rods 57 being in an angularly offset along a horizontal plane in an orthogonal relation. That is, the opposed pair of the stirring rods 56 are angularly spaced apart from the opposed pair of the stirring rods 57 by approximately ninety degrees in a horizontal plane. The stirring rods 56 and 57 extend downward from the upper end 52 to lower ends 58 to provide downwardly extending mixing elements for engaging within the contents o the container 18. The upper portions of the stirring rods 56 and 57 are preferably curved and the lower portions of the string rods 56 are preferably straight, extending vertically when the stirring paddle 16 is mounted to the enclosure 14. The four stirring rods 56 preferably are solid and cylindrical, having circular-shaped cross sections. A support ring 54 extends to and is joined to each of the stirring rods 56 and 57 to provide additional strength flexing of the stirring rods 56 and 57 in relation to one another. The two connecting prongs 60 extend upward from the upper end 52, spaced apart in opposed relation for fitting in two selected ones of the upper ports 34 of respective ones of the inward enclosure 22 and the outward enclosure 24 which are aligned in registration. The prongs 60 extend through the two registered upper ports 34 to non-rotatably secure the stirring paddle 16 centrally disposed, in fixed relation within the enclosure 14. The connecting prongs 60 each have an upwardly extending protrusion 62 with tapered upper ends 64. The tapers of the upper ends 64 of each protrusion 62 face in opposite directions, and aid in guiding the prongs 60 into the two registered upper ports 34. A locking shoulder 66 is preferably disposed adjacent to the lower ends of the tapered upper ends 64 for engaging the upper side of the tops 28 of the outward enclosure half 24 of the enclosure 14. The sides 68 of each of the upward protrusions 62 of the connecting prongs 60 are shaped to fit flush on at least two sides of the upper ports 34 to at least in part non-rotatably secure the stirring paddle 16 in fixed relation to the enclosure 14. The top 28 of the enclosure 14 fits between the locking shoulders 66 of the two connecting prongs 60 and the upper side of the upper end 52 of the stirring paddle 16. The prongs 60 are easily pressed together by hand for removing the stirring paddle 16 from the enclosure 14 for cleaning.

Figure 6:
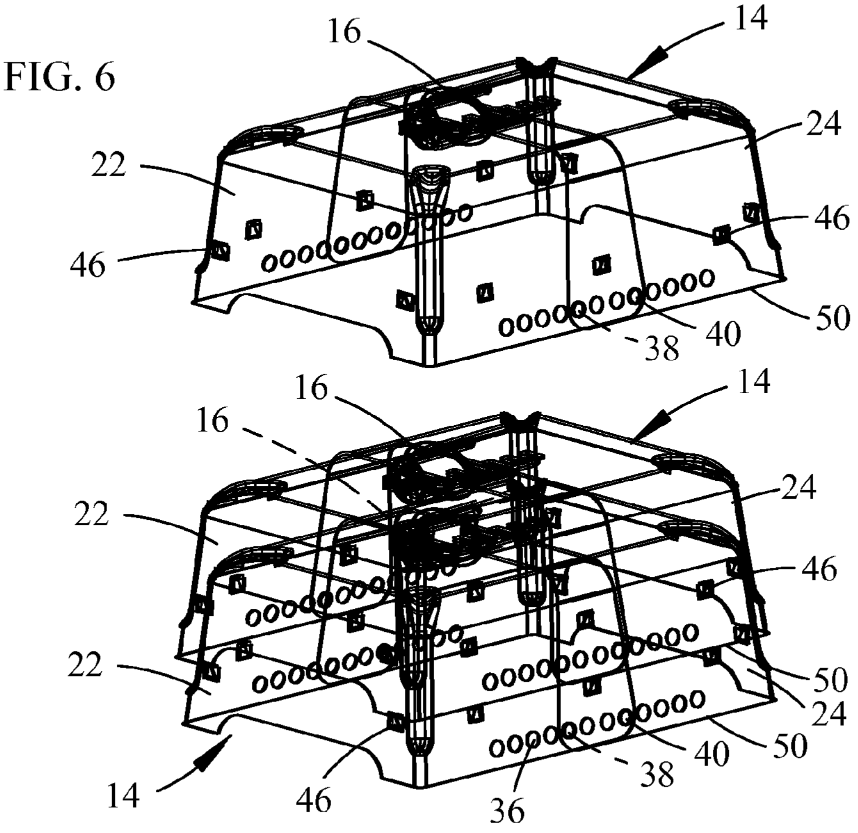

FIG. 6 is a perspective view of a several of the microwave mixing devices 12 being stacked for stowage and shipping. Lower edges 76 of each of the stacked mixing devices 12 are resting on upper portions of respective ones he stacking tabs 46 which extend outward of the enclosure halves 22 and 24. For stowage and transport, the stirring paddles 16 are disposed in horizontal alignment on the tops of respective ones of the enclosures 14, with longitudinal axes of the stirring paddles 16 extending parallel to the tops 28 of the enclosures 14. Preferably, tie wraps or the like are used to secure the inward enclosure halves 22, outward enclosure halves 24 and the paddles of respective ones of the mixing devices 12 in fixed relation.

Figure 7:
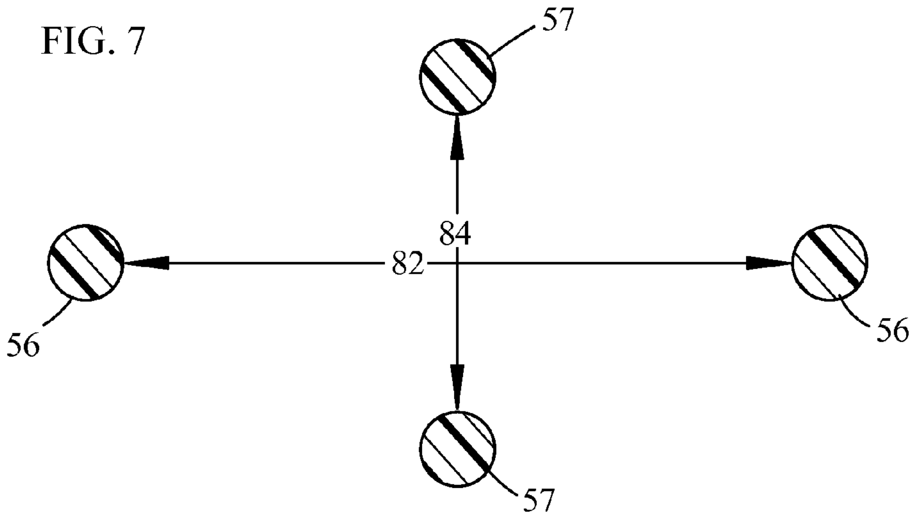
FIG. 7 is a section view of the stirring paddle, taken along section line 7-7 of FIG. 5.

FIG. 7 is a section view of the stirring paddle 16, taken along section line 7-7 of FIG. 5. The stirring rods 56 are spaced apart in opposed arrangement a distance 82 and the stirring rods 57 are spaced apart in an opposed arrangement a distance 84. Preferably the distance 82 is approximately twice as large as the distance 84 for mixing the contents of the container 18. Referring to FIG. 5, it should also be noted that the opposed stirring rods 56 are shorter than the opposed stirring rods 57 to provide clearance with the sides of the container 18.

Figure 8:
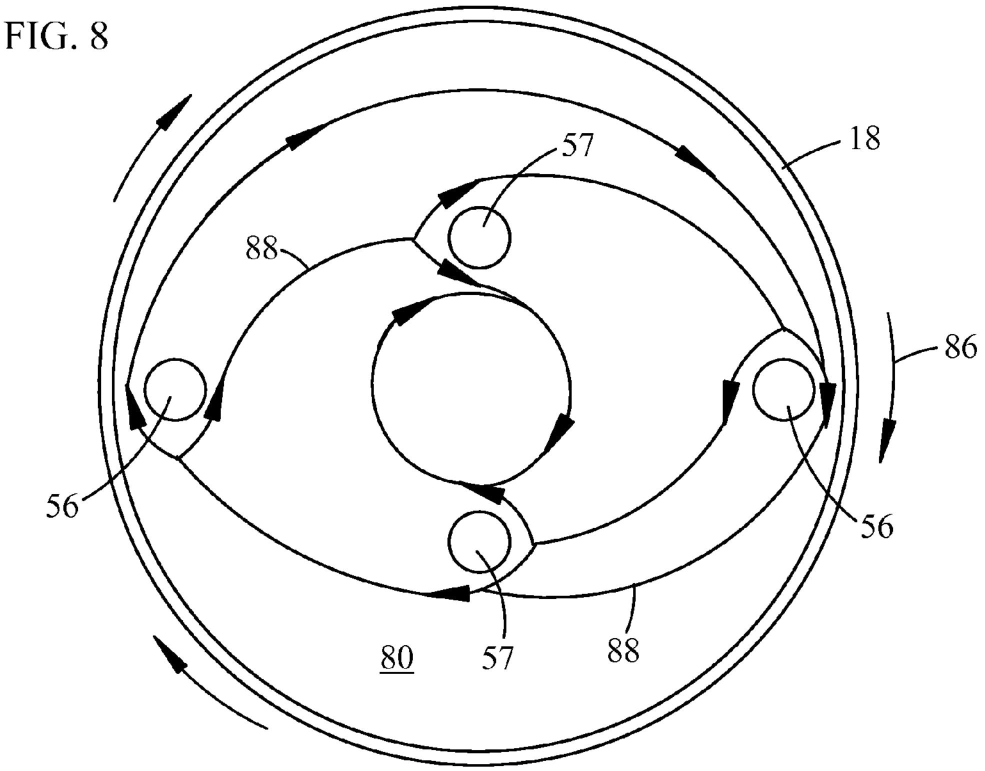
FIG. 8 is a top view of a food container with food contents of the food container rotating through the stirring rods of the stirring paddle.

FIG. 8 is a top view of the food container 18 and food contents 80 with the food contents 80 rotating through the stirring rods 56 and 57 of the stirring paddle 16. The contents 80 are pulled against the stirring rods 56 and 57 by rotation of the container 18, causing the stirring rods 56 and 57 to pass through the contents 80. The stirring rods 56 and 57 are preferably spaced apart by the distances 82 and 84, respectively (shown in FIG. 7), which are unequal to cause kneading of the contents 80. The kneading type of mixing causes movement of the contents 80 along the flow paths 88, which are shown as flow lines in the drawing, such that the contents 80 moves inward and outward with respect the container 18.

In operation, the enclosure halves 22 and 24 are secured together for engaging the sidewalls 26 of the enclosure 14 with the walls of the microwave oven 6. The stirring paddle 16 is mounted to the top 28 of enclosure 14 and extends vertically downward into a centrally disposed region within the enclosure 14. A container 18 with an open top is placed atop the turntable 10. Then the mixing device 12 is placed in the oven 6, with enclosure 14 disposed over the container 18, the stirring paddle 16 extending into the contents of the container 18, and the sidewalls 26 of the enclosure 14 engaging the walls of the microwave oven 8 to prevent the enclosure 14 and the stirring paddle 16 from rotating relative to the microwave oven 8 in response to rotation of the container 18 and the turntable 10. The turntable 10 is rotated and turn the container 18 within the enclosure 14, which moves the contents of the container 18 through the stirring rods 56 of the stationary stirring paddle 16. This effectively moves the stationary stirring rods 56 through the contents of the container 18 and mixes the contents within the container 18 by means of rotating the container 18 atop the turntable 10. After use, the mixing device 12 is removed from the microwave oven and the stirring paddle 16 is cleaned.

The enclosure 14 and the stirring paddle 16 are preferably formed of microwave save, food grade materials, such as a plastic. One example of a suitable material is polycarbonate.

The present invention provides a microwave oven stirring device having a free-standing enclosure and a stirring paddle which extends from a top of the enclosure into the contents of an open top container placed beneath the stirring paddle. The container is located on a microwave oven turntable which rotates the container such and the contents of the container move relative to the stirring paddle, as the stirring paddle remains in stationary position. The stirring paddle is removable from the enclosure to allow cleaning.

Although the preferred embodiment has been described in detail, it should be understood that various changes, substitutions and alterations can be made therein without departing from the spirit and scope of the invention as defined by the appended claims.

What is claimed is:

1. A microwave oven mixing device comprising:

an enclosure having four sides, a top and a bottom, wherein said enclosure is free-standing and said bottom of said enclosure is open, said enclosure being sized for removably fitting within a main cooking cavity of a microwave oven and having at least two opposing sides of said enclosure engaging opposing sidewalls of said main cooking cavity of said microwave oven to prevent rotation of said enclosure within said main cooking cavity;

said enclosure having at least one upper port through said top;

a stirring paddle having an upper end and at least one connecting prong extending upwardly therefrom for non-rotatably extending through said at least one upper port, wherein said at least one upper port and said at least one upwardly extending connecting prong are configured for non-rotatably securing said stirring paddle to said enclosure with said stirring paddle extending downward within a central portion of said enclosure; and said stirring paddle having at least one stirring element extending downward from said upper end of said stirring paddle for sufficient length for engaging with contents of a container disposed within said enclosure.

2. The mixing device according to claim 1, further comprising said enclosure being formed of two halves which include a first enclosure half and a second enclosure half, said first enclosure half have having at least one side port extending through at least one of said sides thereof and said second enclosure half having a first protuberance extending from at least a second one of said sides thereof, wherein said at least one side port and said first protuberance are located and configured to engage for securing said first enclosure half and said second enclosure half together in fixed relation.

3. The mixing device according to claim 2, wherein at least one second side port extends through at least one of said sides of said second enclosure half and said first enclosure half having a second protuberance which extends from said first enclosure half, wherein said at least one second side port and said second protuberance are located and configured to engage for securing said first enclosure half and said second enclosure half together in fixed relation.

4. The mixing device according to claim 3, further comprising:

a plurality of said upper ports provided through said top, with a first part of said plurality of said upper ports extending through said first enclosure half and a second part of said plurality of said upper ports extending through said second enclosure half, wherein at least one said first part of said upper ports and at least one of said second part of said upper ports are aligned in registration for selectively receiving said at least one connecting prong of said stirring paddle;

wherein a plurality of said side ports are provided and a plurality of said second side ports are provided for selectively receiving respective ones of said first protuberance and said second protuberance; and wherein said plurality of said upper ports, said plurality of said side ports, and said plurality of said second side ports are aligned parallel to a longitudinal axis of said enclosure such that said first enclosure half is telescopically extendable relative to said second enclosure half for selectively determining a length of said enclosure.

5. The mixing device according to claim 1, further comprising said stirring paddle having four stirring elements with lower ends extending in spaced apart relation to one another and in parallel for engaging with the contents of the container disposed within said enclosure.

6. The mixing device according to claim 5, further comprising a support ring extending to each of said for stirring elements, between said upper end of said stirring paddle and lower terminal ends of said stirring elements.

7. The mixing device according to claim 1, further comprising said first enclosure half and said second enclosure half each having an edge slot on a lower edge of respective enclosed ends thereof.

8. The mixing device according to claim 1, further comprising protrusions extending outwardly from said sides of said enclosure at a uniform height from said bottom of said enclosure for engaging lower edges of a second enclosure when stacked atop said enclosure for stowage with a plurality of said enclosures.

9. A microwave oven mixing device comprising:

an enclosure having four sides, a top and a bottom, wherein said enclosure is free-standing and said bottom of said enclosure is open, and said enclosure is sized for removably fitting within a main cooking cavity of a microwave oven and having at least two sides of said enclosure engaging sidewalls of said main cooking cavity of said microwave oven to prevent rotation of said enclosure within said main cooking cavity;

a stirring paddle having an upper end non-rotatably secured to said enclosure with said stirring paddle extending downward within a central portion of said enclosure; and said stirring paddle having a plurality of stirring rods which extend downward from said upper end of said stirring paddle and which have lower ends extending in spaced apart relation and in parallel for sufficient length for engaging with contents of a container disposed within said enclosure.

10. The mixing device according to claim 9, further comprising a support ring extending to each of said for stirring elements, between said upper end of said stirring paddle and lower terminal ends of said stirring elements.

11. The mixing device according to claim 9, further comprising said enclosure being formed of two halves which include a first enclosure half and a second enclosure half, said first enclosure half have having at least one side port extending through at least one of said sides thereof and said second enclosure half having a first protuberance extending from at least a second one of said sides thereof, wherein said at least one side port and said first protuberance are located and configured to engage for securing said first enclosure half and said second enclosure half together in fixed relation.

12. The mixing device according to claim 11, wherein at least one second side port extends through at least one of said sides of said second enclosure half and said first enclosure half having a second protuberance which extends from said first enclosure half, wherein said at least one second side port and said second protuberance are located and configured to engage for securing said first enclosure half and said second enclosure half together in fixed relation.

13. The mixing device according to claim 12, further comprising:

a plurality of said upper ports provided through said top, with a first part of said plurality of said upper ports extending through said first enclosure half and a second part of said plurality of said upper ports extending through said second enclosure half, wherein at least one of said first part of said upper ports and at least one of said second part of said upper ports are aligned in registration for selectively receiving said at least one connecting prong of said stirring paddle;

wherein a plurality of said side ports are provided and a plurality of said second side ports are provided for selectively receiving respective ones of said first protuberance and said second protuberance; and wherein said plurality of said upper ports, said plurality of said side ports, and said plurality of said second side ports are aligned parallel to a longitudinal axis of said enclosure such that said first enclosure half is telescopically extendable relative to said second enclosure half for selectively determining a length of said enclosure.

14. The mixing device according to claim 9, further comprising said first enclosure half and said second enclosure half each having an edge slot on a lower edge of respective enclosed ends thereof.

15. The mixing device according to claim 9, further comprising protrusions extending outwardly from said sides of said enclosure at a uniform height from said bottom of said enclosure for engaging lower edges of a second enclosure when stacked atop said first enclosure for stowage of a plurality of said enclosures.

16. A microwave oven mixing device comprising:

an enclosure having four sides, a top and a bottom, wherein said enclosure is free-standing and said bottom of said enclosure is open, and said enclosure is sized for removably fitting within a main cooking cavity of a microwave oven and having at least two sides of said enclosure engaging sidewalls of said main cooking cavity of said microwave oven to prevent rotation of said enclosure within said main cooking cavity;

said enclosure being formed of two halves which include a first enclosure half and a second enclosure half, said first enclosure half have having at least one side port extending through at least one of said sides thereof and said second enclosure half having a protuberance extending from at least a second one of said sides thereof, wherein said at least one side port and said protuberance are located and configured to engage for securing said first enclosure half and said second enclosure half together in fixed relation;

wherein at least one second side port extends through at least one of said sides of said second enclosure half and said first enclosure half having a second protuberance which extends from said first enclosure half, wherein said at least one second side port and said second protuberance are located and configured to engage for securing said first enclosure half and said second enclosure half together in fixed relation;

said enclosure having at least one upper port through said top;

a stirring paddle having an upper end and at least one connecting prong extending upwardly therefrom for non-rotatably extending through said at least one upper port, wherein said at least one upper port and said at least one upwardly extending connecting prong are configured for non-rotatably securing said stirring paddle to said enclosure with said stirring paddle extending downward within a central portion of said enclosure; and said stirring paddle having a plurality of stirring rods which extend downward from said upper end of said stirring paddle and which have lower ends extending in spaced apart relation and in parallel for sufficient length for engaging with contents of a container disposed within said enclosure.

17. The mixing device according to claim 16, further comprising a support ring extending to each of said for stirring elements, between said upper end of said stirring paddle and lower terminal ends of said stirring elements.

18. The mixing device according to claim 16, further comprising:

a plurality of said upper ports provided through said top, with a first part of said plurality of said upper ports extending through said first enclosure half and a second part of said plurality of said upper ports extending through said second enclosure half, wherein at least one of said first part of said upper ports and at least one of said second part of said upper ports are aligned in registration for selectively receiving said at least one connecting prong of said stirring paddle;

wherein a plurality of said side ports are provided and a plurality of said second side ports are provided for selectively receiving respective ones of said first protuberance and said second protuberance; and wherein said plurality of said upper ports, said plurality of said side ports, and said plurality of said second side ports are aligned parallel to a longitudinal axis of said enclosure such that said first enclosure half is telescopically extendable relative to said second enclosure half for selectively determining a length of said enclosure.

19. The mixing device according to claim 16, further comprising said first enclosure half and said second enclosure half each having an edge slot on a lower edge of respective enclosed ends thereof.

20. The mixing device according to claim 16, further comprising protrusions extending outwardly from said sides of said enclosure at a uniform height from said bottom of said enclosure for engaging lower edges of a second enclosure when stacked atop said first enclosure for stowage of a plurality of said enclosures.

* * * * *